(12) United States Patent
Bergmann et al.

(10) Patent No.: US 12,552,448 B2
(45) Date of Patent: Feb. 17, 2026

(54) CONTROL DEVICE FOR A HYDRAULIC STEERING DEVICE

(71) Applicant: Hydac New Technologies GmbH, Sulzbach / Saar (DE)

(72) Inventors: Erhard Bergmann, Banzkow (DE); Markus De La Motte, Muchow (DE); Helmut Funk, Karrenzin (DE)

(73) Assignee: HYDAC NEW TECHNOLOGIES GMBH, Sulzbach/Saar (DE)

( * ) Notice: Subject to any disclaimer, the term of this patent is extended or adjusted under 35 U.S.C. 154(b) by 432 days.

(21) Appl. No.: 18/261,947

(22) PCT Filed: Jan. 31, 2022

(86) PCT No.: PCT/EP2022/052232
§ 371 (c)(1),
(2) Date: Jul. 18, 2023

(87) PCT Pub. No.: WO2022/171477
PCT Pub. Date: Aug. 18, 2022

(65) Prior Publication Data
US 2024/0067262 A1    Feb. 29, 2024

(30) Foreign Application Priority Data
Feb. 10, 2021    (DE) .................... 10 2021 000 686.0

(51) Int. Cl.
*B62D 5/09* (2006.01)
*B62D 5/00* (2006.01)

(52) U.S. Cl.
CPC .............. *B62D 5/091* (2013.01); *B62D 5/003* (2013.01)

(58) Field of Classification Search
CPC ............................ B62D 5/091; B62D 5/003
See application file for complete search history.

(56) References Cited

U.S. PATENT DOCUMENTS

| 6,273,468 | B1 | 8/2001 | Bohner | 280/775 |
| 2008/0053740 | A1 | 3/2008 | Hublart | B62D 5/04 |
| 2024/0017764 | A1 | 1/2024 | Bergmann et al. | |

FOREIGN PATENT DOCUMENTS

| DE | 10257130 A1 * | 7/2004 | ............ B62D 5/091 |
| DE | 102020006585 A1 | 4/2022 | |

(Continued)

OTHER PUBLICATIONS

Search Report for International Application No. PCT/EP2022/052232, 4 pages, May 17, 2022.

(Continued)

*Primary Examiner* — Kevin Hurley
(74) *Attorney, Agent, or Firm* — Slayden Grubert Beard PLLC

(57) ABSTRACT

Disclosed is a control device for a hydraulic steering device, having a control input device and an electrically operable valve for actuating a steering actuator of the steering device, which valve can be electrically actuated as a function of steering setpoint values detected at the control input device via at least one first control path between the control input device and the valve, wherein the control device is set up in such a way that the relevant first control paths can be deactivated as a function of steering setpoint values detected at the control input device via respective second control paths, which are assigned to this relevant first control path and differ at least partially from the respective first control paths when this first control path is active, or can be activated when this first control path is deactivated.

20 Claims, 2 Drawing Sheets

(56) References Cited

FOREIGN PATENT DOCUMENTS

EP 2254785 B1 10/2013
GB 2341586 A * 3/2000 ............... B62D 5/06

OTHER PUBLICATIONS

European Office Action, Application No. 22702950.1, 6 pages, Jan. 31, 2025.

* cited by examiner

CONTROL DEVICE FOR A HYDRAULIC STEERING DEVICE

CROSS-REFERENCE TO RELATED APPLICATIONS

This application claims priority to German Patent Application No. DE 10 2021 000 686.0, filed on Feb. 10, 2021 with the German Patent and Trademark Office. The contents of the aforesaid Patent Application are incorporated herein for all purposes.

TECHNICAL FIELD

The invention relates to a control device for a hydraulic steering device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The post-published DE 10 2020 006 585 discloses a control device for a hydraulic steering device, having a control input device in the form of a hand wheel, a control unit and an electrically operable directional valve, which, in its unoperated position, blocks a fluid-conveying connection between a pressure supply source and a steering actuator of the steering device and, in its operated position, actuates the steering actuator in one or the other steering direction. A steering angle setpoint sensor, which detects the steering angle of the hand wheel, is connected to the input end of the control unit, and two magnet operating devices for a directional valve piston are connected to the output end. The paths from the steering angle setpoint generator to the one or the other magnet operating device, where the steering angle setpoints are first detected and then processed by the control unit, which ultimately actuates the relevant magnet operating device for a travel motion of the valve piston of the directional valve as a function of the processed setpoints, can be regarded as one control path each.

SUMMARY

A need exists to provide a control device for a hydraulic steering that is improved in terms of its functional reliability.

The need is addressed by a control device having the features of claim 1. Embodiments of the invention are described in the dependent claims, the following description, and the drawings.

DESCRIPTION

Figure 1:
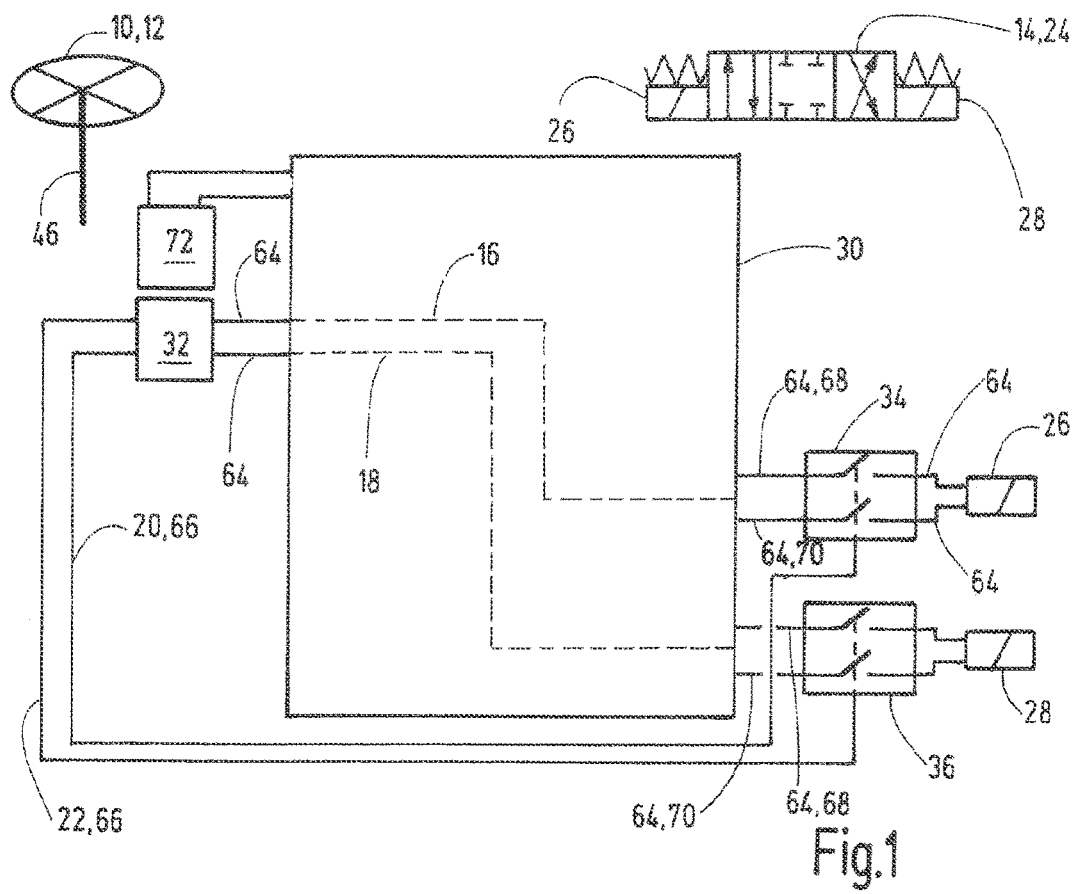
FIG. 1 shows a schematic block diagram of the control device according to embodiments.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a control device has a control input device, such as, for instance, a hand wheel or a control stick, and an electrically operable valve for actuating a steering actuator of the steering device, which valve can be electrically actuated as a function of steering setpoint values detected at the control input device via at least one first control path between the control input device and the valve, wherein the control device is set up in such a way that the first control path can be deactivated as a function of setpoint values, that is to say other steering setpoint values detected at the control input device or the steering setpoint values, via respective second control paths, which are assigned to this first control path and at least partially differ from the respective first control paths, when this first control path is active or can be activated when this first control path is inactive.

The control device is designed in such a way that a magnet operating device of the valve is energized only if the device actuating this magnet operating device, such as a control unit, emits an actuating current in the direction of the operating device via the first control path and—in comparison to the prior art mentioned at the outset—this first control path is additionally not deactivated or activated via the second control path. Because of such at least partially separated control paths, of which the first control path is enabled or disabled via the second control path, a further effect of a malfunction of a device component, in particular of the device energizing the magnet operating device, can be prevented. The further effect of a malfunction is an incorrect motion of the valve piston of the valve, which, if the control device is part of a hydraulic steering device, can result in incorrect, i.e., unwanted, steering motions that can result in dangerous driving situations. They are prevented by the control device designed in this way. Therefore, as a result, the control device is improved in terms of its operational reliability.

In some embodiments, a provision is made for a single control unit to be provided disposed in each first control path, to which control unit a steering signal dependent on the steering setpoints is transmitted via the relevant first control path and which control unit outputs a control signal for actuating the valve on this first control path, and in that each first control path is routed through the control unit and each second control path is routed past the control unit. As a result, the control unit has no influence on a switching signal for interrupting or closing the first control path, to prevent an incorrectly operating control unit from simultaneously emitting an incorrect actuation signal and a switching signal each. For example, each second control path is completely distinct from each first control path, i.e., any faulty component of the control device cannot simultaneously have a faulty effect on components of the first and second control paths, as may happen when the first and second control paths share at least a part of their paths and sharing components.

In some embodiments, a provision is made for a signal generation device to be provided in the relevant second control path for generating a switching signal as a function of the steering setpoint values detected at the control input device, by means of which the first control path, to which this second control path is assigned, can be either interrupted or closed. For example, provision is made for a switch to be disposed in each first control path, which, actuated by the switching signal, either interrupts or closes this first control path. As a result, in the event of a fault, the respective first control path can be interrupted by hardware between the control unit and the relevant magnet operating device of the valve, to prevent the control unit from actuating this magnet operating device by energizing it via the first control path, even if the control unit outputs an energization to this effect.

In some embodiments, a provision is made for at least one sensor each to be provided for generating the steering signal of a first control path and for generating the switching signal of a second control path assigned thereto, by means of which this first control path can be interrupted or closed, which sensors detect steering setpoint values at the control input device independently of each other. This ensures that incorrectly detected steering setpoints do not simultaneously affect the steering signal of a relevant first control path and the switching signal of the second control path assigned thereto.

In some embodiments, a provision is made for the valve piston of the valve to be movable in opposite directions by means of magnet operating devices disposed on opposite ends of the valve piston, wherein the control device is set up in such a way that, when the relevant switch in the relevant first control path leading to the one magnet operating device permits the one magnet operating device to be energized, the relevant switch in the relevant first path leading to the other magnet operating device simultaneously at least partially interrupts this first path and thus prevents the energization of the other magnet operating device. This prevents the valve piston from being operated simultaneously in its two opposite directions of travel in the event of a faulty component of the relevant first control path, such that unwanted travel motions of the valve piston are counteracted, further improving the operational reliability of the control device.

In some embodiments, provision is made for a plurality of sensors to be provided for controlling the energization of one magnet operating device, which sensors detect steering command values at the control input device independently of a plurality of sensors provided for controlling the energization of the other magnet operating device. This prevents flawed detected steering setpoints from having a flawed effect on the respective steering and/or switching signals for energizing several magnet operating devices at the same time.

Furthermore, the present disclosure addresses the problem of providing a hydraulic steering device having such a control device and a steering actuator, which can be actuated by the valve of the control device, which, designed as a directional valve, blocks the fluid-conveying connection between a pressure supply device and the steering actuator in its unoperated position and in its operated position actuates the steering actuator either in one or in the other steering direction.

In the following, a control device is discussed in more detail with reference to the drawings. Specific references to components, process steps, and other elements are not intended to be limiting. Further, it is understood that like parts bear the same or similar reference numerals when referring to alternate FIGS.

FIG. 1 shows a control device, which has a control input device 10 in the form of a hand wheel 12 and an electromagnetically actuatable valve 14. The valve 14 can be electromagnetically actuated as a function of steering setpoint values detected at the control input device 10 via at least one first control path 16, 18, which is formed between the control input device 10 and the valve 14. The control device is set up in such a way that, as a function of steering setpoint values detected at the control input device 10, these first control paths 16, 18 can be deactivated via respective second control paths 20, 22, which are assigned to the respective first control paths 16, 18 and differ completely from the respective first control paths 16, 18, if the former is currently active or can be activated if it is currently inactive.

The valve 14 has a valve piston 24, which can be moved in opposite directions by means of magnet operating devices 26, 28 disposed on opposite ends of the valve piston 24.

The control device also has a control unit 30 and a steering wheel sensor 32 that detects steering setpoints on the hand wheel 12 and outputs a steering signal containing information about the steering angle and, if applicable, the steering wheel speed of the hand wheel 12. The control unit 30 is a category 2 controller according to DIN EN ISO 13849. The steering wheel sensor 32 is connected to the input end of the control unit 30, to the output end of which the two magnet operating devices 26, 28 of the valve 14 are connected. The path from and including the steering sensor 32 up to and including one 26 and the other 28 magnet operating devices, where the steering setpoints are first detected and then processed, and finally the respective magnet operating devices 26, 28 is actuated by the control unit 30 in response to the processed setpoints to move the valve piston 24 of the valve 14, is at least part of a first 16 or of a further first 18 control path.

The control device further comprises one 34 and a further 36 switch disposed between the control unit 30 and the valve 14 in the first 16 and the further first 18 control path, respectively, for interrupting and closing the relevant first control path 16, 18, which means activating or deactivating, respectively, this control path 16, 18. The respective switches 34, 36 are designed in the form of an electromechanical relay or a semiconductor relay. On the output end, the steering wheel sensor 32 is additionally connected to the two switches 34, 36 for the purpose of actuating the relevant switch 34, 36 to interrupt or close the relevant first control path 16, 18. The path from including the steering wheel sensor 32 to the one 34 and the further 36 switch is at least part of a second 20 and a further second 22 control path, respectively, both of which are routed past the control unit 30.

Figure 2:
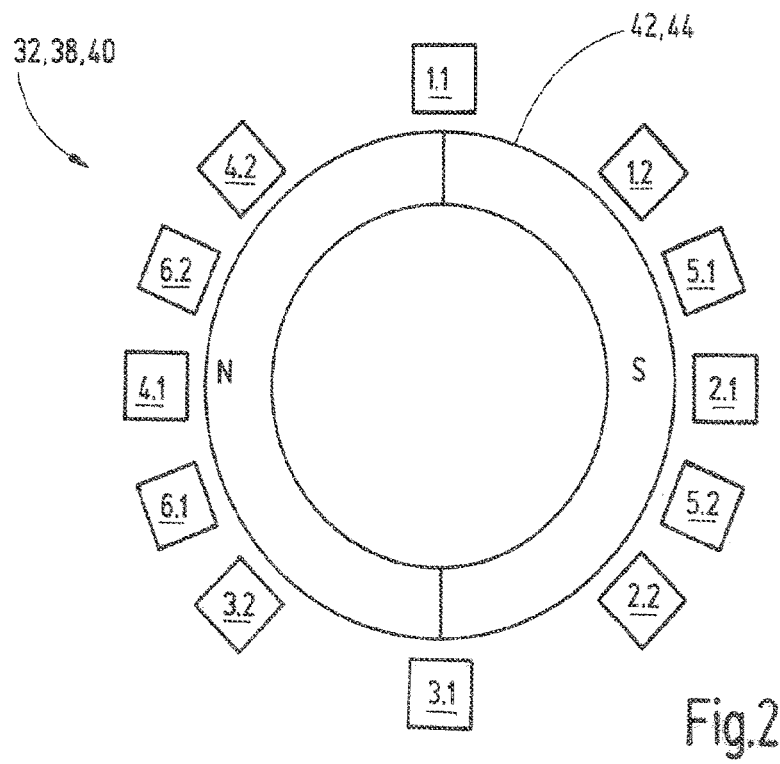
FIG. 2 shows a schematically simplified example schematic diagram of the structure of a part of the steering sensor of the control device of FIG. 1.
Figure 3:
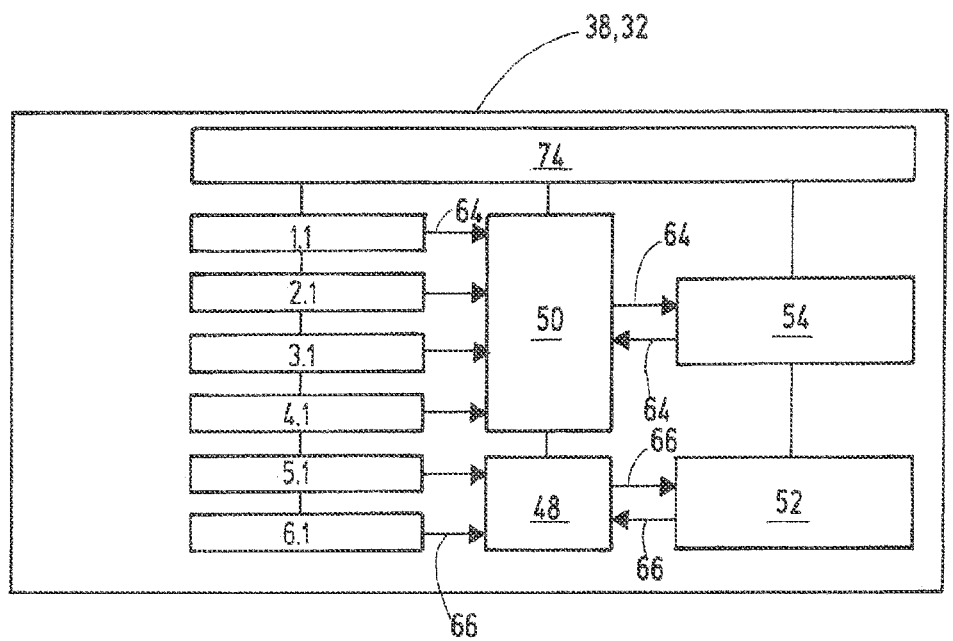
FIGS. 3 and 4 show example schematic block diagrams each of a different part of the steering sensor for actuating one and another magnet operating device, respectively, of a valve of the control device of FIG. 1.
Figure 4:
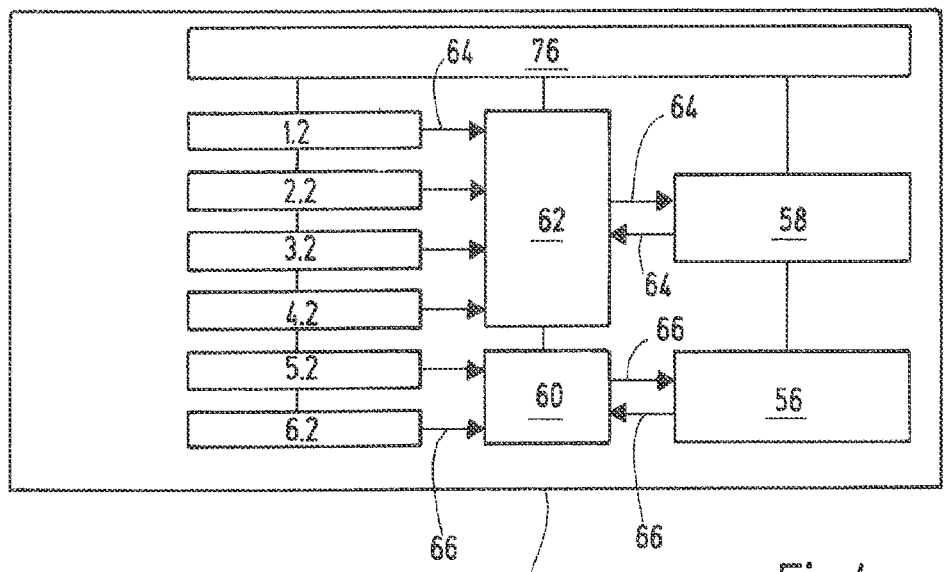

The steering wheel sensor 32 has two steering sensor devices 38, 40. FIG. 2 shows a part of both 38, 40 sensor devices; FIG. 3 and FIG. 4 show another part of one 38 and the other 40 sensor device, respectively, overlapping with the part of FIG. 2. The only shared component of the two steering sensor devices 38, 40 is a permanent magnet 42 in the form of a magnetic pole ring 44, which has a north pole N and a south pole S and which is mounted for co-rotation on a steering column 46, which is secured for co-rotation with respect to the hand wheel 12 and coaxial to the steering column. A plurality of sensors 1.1 to 6.1; 1.2 to 6.2 of the steering sensor devices 38, 40 are disposed in the form of individual Hall sensors spaced apart from the permanent magnet 42 in the radial direction and spaced apart from each other in the circumferential direction around the permanent magnet 42. Every sensor 1.1 to 6.1; 1.2 to 6.2 detects the magnetic flux density of the magnetic field of the permanent magnet 42 and outputs values, in particular voltage values, which are proportional to the magnetic flux density at its output. These values are the steering setpoints.

Each sensor device 38, 40 has two groups of sensors 1.1 to 4.1, 5.1 and 6.1; 1.2 to 4.2, 5.2 and 6.2, in each of which there is an even number of sensors. Thus, the steering setpoints for actuating the valve 14 on the relevant first control path 16, 18 differ from the steering setpoints for activating or deactivating the relevant first control paths 16, 18 via the relevant second control paths 20, 22, if necessary, with regard to their value, but in any case, with regard to the sensors by which they are detected.

For example, each sensor device 38, 40 has six sensors 1.1 to 6.1; 1.2 to 6.2. The sensors 1.1 to 6.1, 1.2 to 6.2 may face each other in pairs with respect to the permanent magnet 42. For instance, one sensor device 38 has sensors 1.1 through 6.1, measured clockwise, at 0 and 180 degrees, at 90 and 270 degrees, and at approx. 70 and approx. 250 degrees, whereas the other sensor device 40 has sensors 1.2 through 6.2 at 45 and 225 degrees, at 135 and 315 degrees, and at approx. 110 and approx. 290 degrees. This specific arrangement of sensors 1.1 to 6.1; 1.2 to 6.2 is chosen merely as an example to illustrate the basic principle, i.e., any other relevant arrangement of sensors 1.1 to 6.1; 1.2 to 6.2 is equally conceivable.

Below, the two sensor devices 38, 40, which are otherwise equal in terms of their structure, are explained in more detail on the basis of one sensor device 38.

A group of the sensors 5.1, 6.1 of the one sensing device 38 for generating a switching signal for the one switch 34 is connected to the input end of a signal generation device 48 of the one sensing device 38. In particular, the one group comprises two sensors 5.1, 6.1, which can be disposed at 180 degrees offset from each other. The switching signal is a voltage signal. Another group of the sensors 1.1 to 4.1 of this one sensor device 38 is connected to the input end of a further signal generation device 50 for generating a steering signal of the first control path 16. In particular, the other group comprises four sensors 1.1 to 4.1, each of which may be offset by 90 degrees from their respective adjacent sensors 1.1 to 4.1. The steering signal is a current signal; however, it would also be conceivable for the steering signal to be a CAN bus signal. The one 48 and the further 50 signal generation devices are each designed as evaluation logic, which can be based on an evaluation algorithm. The one 48 and the further 50 signal generation devices are connected, particularly each bidirectionally, to one 52 and a further 54 signal output, respectively, of the one sensor device 38. One signal output 52, which outputs the switching signal, is connected to the one switch 34, and the further signal output 54, which outputs the steering signal, is connected to the control unit 30.

The other sensor device 40 has sensors 1.2 to 6.2 differing from the one sensor device 38 and its further signal output 58 is connected to the control unit 30 and its one signal output 56 is connected to the further switch 36. Thus, the signal generation device 60 of the other sensor device 40 is used to generate a switching signal for the further switch 36 and its further signal generation device 62 is used to generate a steering signal of the further first control path 18.

The one 16 and the further first 18 control paths include the other group of sensing devices 1.1 to 4.1; 1.2 to 4.2, the further signal generation devices 50, 62 and the further signal outputs 54, 58, respectively, of the one 38 and the other 40 sensing device, respectively, the control unit 30, the one 34 and the further 36 switch, respectively, and the one 26 and the other 28 magnet operating device, respectively, and transmission means 64 in the form of electric lines connecting these components of the respective first control paths 16, 18. The one 20 and the further second 22 control paths include the one set of sensing devices 5.1, 6.1; 5.2, 6.2, the one signal generation device 48, 60 and the one signal output 52, 56, respectively, of the one 38 and the other 40 sensing devices, respectively, and the respective transmission means 66 in the form of electrical lines interconnecting these components of the respective second control paths 20, 22 and connecting the respective signal outputs 52, 56 to the one 34 and the further 36 switches, respectively. The one 20 and the further second 22 control paths are assigned to the one 16 and the further first 18 control paths, respectively.

Any electrical connection between the control unit 30 and one 26 or the other 28 magnet operating device is of the two-wire type. One 68 (high-end) and the other 70 (low-end) wires are connected to one and the other end, respectively, of a coil of the respective magnet operating devices 26, 28 (not shown in the FIGS.). The relevant switch 34, 36 simultaneously interrupts or closes both wires 68, 70 of the relevant connection, as shown in FIG. 1, but it is also conceivable that this switch 34, 36 is provided in only one of the two wires 68, 70, i.e., interrupts or closes only one of the two wires 68, 70.

Further, one power supply 72, 74, 76 each is provided for of the control unit 30, the one 38 and the other 40 sensor devices.

The control device is part of a hydraulic steering device, which, in addition to the control device, has a steering actuator not shown in the figures, which can be actuated by the valve 14 of the control device in the form of a directional valve, which, in its unoperated position, blocks the fluid-conveying connection between a pressure supply device not shown in the figures and the steering actuator and, in its operated position, actuates the steering actuator either in one or the other steering direction. For the further design of the hydraulic steering device, reference is made to DE 10 2020 006 585.

The functioning of the control device according to the invention is explained in more detail below:

When the permanent magnet 42 rotates as part of a steering motion to the hand steering wheel 12, the orientation of the magnetic field of the magnet changes, wherein the sensors 1.1 to 6.1; 1.2 to 6.2 of the respective group of one 38 and the other 40 sensor device each detect the changes in the magnetic flux independently of the group. On the one 20 and the further second 22 control path, depending on the steering setpoint values of the respective one group of sensors 5.1, 6.1; 5.2, 6.2, the two signal generation devices 48, 60 each compute independently of each other a switching signal in the form of a voltage signal, by means of which the two switches 34, 36 are actuated for interrupting or closing the respective first control paths 16, 18.

At the same time, the two further signal generation devices 50, 62 on the one 16 and the further first 18 control path each independently compute a steering signal in the form of a current signal, which contains information relating to the steering angle and, if applicable, the steering wheel speed of the steering hand wheel 12, as a function of the steering setpoint values of the respective other group of sensors 1.1 to 4.1; 1.2 to 4.2. The steering signals are transmitted on the relevant first 16, 18 control path to the control unit 30, which outputs an actuation signal for the one magnet operating device 26 as a function of the steering signal from the one sensor device 38 on the one first control path 16 and an actuation signal for the other magnet operating device 28 as a function of the steering signal from the other sensor device 40 on the further first control path 18. The individual actuation signal emitted by the control unit 30 reaches the coil of the respective magnet operating devices 26, 28 and energizes it, when the switch 34, 36 disposed in the relevant first control path 16, 18 is closed. However, when the switch 34, 36 disposed in the relevant first control path 16, 18 is open, the respective magnet operating devices 26, 28 are not energized.

Thus, in order to energize a relevant magnet operating device 26, 28, in addition to a matching actuation signal emitted by the control unit 30 on a relevant first control path 16, 18, the switch 34, 36 has to receive a switching signal in the sense of an enable signal from the steering sensor 32 via the relevant second control path 20, 22 assigned to this first control path 16, 18, which closes the switch 34, 36 if it is open or keeps it closed if it is already closed, permitting the energization of this magnet operating device 26, 28. This increases the operational reliability of the control device.

In addition, the two switches 34, 36 are actuated by the steering sensor 32, in particular by the two signal generation devices 48, 60, in such a way that when the switch 34 in the first control path 16 leading to the one magnet operating device 26 permits the energization of the one magnet operating device 26, the switch 36 in the further first path 18 leading to the other magnet operating device 28 simultaneously interrupts this first path 18 and thus prevents the other magnet operating device 28 from being energized, and vice versa. Thus, at least when the hand wheel 12 is turned for steering, one of the switches 34, 36 is closed and the other switch 36, 34 is open. This precludes the valve piston 24 of valve 14 from being operated simultaneously by both magnet operating devices 26, 28 for travel in opposite directions in the event of a fault, further improving the operational reliability of the control device.

When the control device is used in a hydraulic steering device, faulty, i.e., unwanted, steering motions can be prevented by this control device. Thus, the control device ensures that during a rotational motion of the hand wheel 12 in one direction of rotation, the magnet operating device 26, 28 of the valve 14, which is not responsible for a matching steering direction, remains unactuated, even if the control unit incorrectly transmits an actuation signal to this magnet operating device 26, 28. This prevents the steering actuator from being incorrectly actuated in a steering direction opposite to the intended steering direction.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A control device for a hydraulic steering device, having a control input device and an electrically operable valve for actuating a steering actuator of the steering device, which valve can be electrically actuated as a function of steering setpoint values detected at the control input device via at least one first control path between the control input device and the valve, wherein the control device is configured so that the first control path can be deactivated as a function of steering setpoint values detected at the control input device via at least one respective second control path, which is assigned to the first control path and differs at least partially from the first control path when the first control path is active, or can be activated when the first control path is deactivated.

2. The control device of claim 1, wherein a control unit is provided, which is disposed in each first control path, to which control unit a steering signal dependent on the steering setpoints is transmitted on the first control path and which control unit outputs an actuation signal on the first control path for actuating the valve, and wherein each first control path is routed through the control unit and each second control path is routed past the control unit.

3. The control device of claim 1, wherein each second control path is completely distinct from each first control path.

4. The control device of claim 1, wherein a signal generation device is provided in the second control path for generating a signal as a function of the steering setpoint values detected at the control input device, which signal generation device can be used to either interrupt or close the first control path to which this second control path is assigned.

5. The control device of claim 1, wherein a switch is disposed in the first control path, which switch, actuated by a switching signal, either interrupts or closes this first control path.

6. The control device of claim 1, wherein at least one sensor is provided for generating a steering signal of the at least one first control path and for generating a switching signal by means of which this first control path can be interrupted or closed, which sensors detect steering setpoint values at the control input device independently of each other.

7. The control device of claim 1, wherein a further signal generation device is provided in the first control path for generating a steering signal as a function of the steering setpoint values detected at the control input device.

8. The control device of claim 1, wherein a valve piston of the valve can be moved in opposite directions by means of magnet operating devices disposed on opposite ends of the valve piston, wherein the control device is configured such that, when the relevant switch in the relevant first control path leading to the one magnet operating device permits the one magnet operating device to be energized, the relevant switch in the relevant first path leading to the other magnet operating device at least partially interrupts this first path and thus prevents the energization of the other magnet operating devices.

9. The control device of claim 1, wherein a plurality of sensors are provided for controlling the energization of the one magnet operating device, which sensors detect steering command values at the control input device independently of a plurality of sensors provided for controlling the energization of the other magnet operating device.

10. A hydraulic steering device having the control device of claim 1 and having a steering actuator, which can be actuated by the valve of the control device, which, designed as a directional valve, blocks the fluid-conveying connection between a pressure supply device and the steering actuator in its unoperated position and in its operated position actuates the steering actuator either in one or the other steering direction.

11. The control device of claim 2, wherein each second control path is completely distinct from each first control path.

12. The control device of claim 2, wherein a signal generation device is provided in the second control path for generating a signal as a function of the steering setpoint values detected at the control input device, which signal generation device can be used to either interrupt or close the first control path to which this second control path is assigned.

13. The control device of claim 3, wherein a signal generation device is provided in the second control path for generating a signal as a function of the steering setpoint values detected at the control input device, which signal generation device can be used to either interrupt or close the first control path to which this second control path is assigned.

14. The control device of claim 4, wherein the signal is a switching signal.

15. The control device of claim 2, wherein a switch is disposed in the first control path, which switch, actuated by a switching signal, either interrupts or closes this first control path.

16. The control device of claim 3, wherein a switch is disposed in the first control path, which switch, actuated by a switching signal, either interrupts or closes this first control path.

17. The control device of claim 4, wherein a switch is disposed in the first control path, which switch, actuated by a switching signal, either interrupts or closes this first control path.

18. The control device of claim 2, wherein at least one sensor is provided for generating a steering signal of the at least one first control path and for generating a switching signal by means of which this first control path can be interrupted or closed, which sensors detect steering setpoint values at the control input device independently of each other.

19. The control device of claim 3, wherein at least one sensor is provided for generating a steering signal of the at least one first control path and for generating a switching signal by means of which this first control path can be interrupted or closed, which sensors detect steering setpoint values at the control input device independently of each other.

20. The control device of claim 4, wherein at least one sensor is provided for generating a steering signal of the at least one first control path and for generating a switching signal by means of which this first control path can be interrupted or closed, which sensors detect steering setpoint values at the control input device independently of each other.

* * * * *